UNITED STATES PATENT OFFICE.

HOLGER DE FINE OLIVARIUS, OF SAN FRANCISCO, CALIFORNIA.

PROCESS FOR RECOVERING MATERIALS FROM MOLASSES.

1,401,433.  Specification of Letters Patent.  Patented Dec. 27, 1921.

No Drawing.  Application filed January 14, 1919. Serial No. 271,104.

*To all whom it may concern:*

Be it known that I, HOLGER DE FINE OLIVARIUS, a subject of the King of Denmark, and a resident of the city and county of San Francisco and State of California, have invented a certain new and useful Process for Recovering Materials from Molasses, of which the following is a specification.

The invention relates to a process of recovering sucrose and potassium from molasses.

An object of the invention is to provide a commercial process for removing sucrose from molasses.

A further object of the invention is to provide a commercial process for recovering potassium from molasses.

The invention possesses other advantageous features some of which, with the foregoing, will be set forth at length in the following description, where I shall outline in full one method of carrying out the process of my invention. It is to be understood that I do not confine myself to the procedure described herein, since the process as set forth in the claim may be practised with other procedure.

Molasses ordinarily contains invert sugar, the quantity thereof varying with different grades of molasses. If invert sugar is present, the first step in my process consists in eliminating the principal portion of the invert sugar. This is accomplished by diluting the molasses with water, when necessary, until the solution contains about 5% invert sugar. The solution is then neutralized with calcium carbonate, boiled for the purpose of sterilization and then cooled. Pure culture of the yeast "Saccharomyses apiculatus" is then added to the solution to produce fermentation of the invert sugar. This culture ferments the invert sugar without affecting the sucrose. After fermentation is completed, the solution is again diluted with water until it contains from 18 to 20% sucrose. This concentration of the sucrose may be obtained without the addition of water, by a proper blending of different molasses at the beginning of the process. The invert sugar content of the molasses is sometimes great, with the result that it is necessary to add a large amount of water before fermentation, so that after fermentation the sucrose content is below 18–20%. In such instances it is advisable to concentrate the solution by evaporation after fermentation, to produce the proper sucrose content.

The next step in the process consists in precipitating the principal portion of the organic and coloring materials. The molasses solution, from which the invert sugar has been substantially eliminated, is mixed with an equal amount of cold alcohol, preferably about 90% alcohol, and to this mixture is added ground or pulverized lime. The amount of lime added will vary with different grades of molasses, but in most cases will be from 10% to 25% of the amount of sucrose present, and is determined by experiment on a small quantity of the molasses, the amount of lime used being that which will precipitate the non-sugars without precipitating the sucrose. The lime will cause the precipitation of the organic and coloring materials, and will not substantially affect the sucrose. The mixture is constantly stirred for several hours after the lime has been added, until precipitation is complete, after which the precipitate is removed by filtration, pressed and washed with warm water, to recover all of the alcohol and sugar therein.

The alcoholic filtrate, which contains the sucrose and inorganic salts, is mixed with pulverized lime and continuously stirred for several hours, the amount of lime added being approximately 80% of the sucrose content. The sucrose combines with the lime forming calcium saccharate which is precipitated in crystalline form, being insoluble in the alcohol solution. The saccharate is removed by filtration and washed with a cold 10% alcohol solution.

This wash solution is added to the filtrate, which contains substantially all of the potassium in strong alcoholic solution, from which it may be recovered in different ways. The solution may be neutralized with sulfuric acid, causing the precipitation of calcium sulfate which is removed by filtration. The filtrate is then treated with tartaric acid which reacts with the potassium present, to form potassium bitartrate which is precipitated in the alcoholic solution and from which it is removed by filtration and washed with cold water. The alcohol is recovered from the remaining solution by distillation and the residue is added to the wash solution used in washing the precipitated organic matter. The mixture thus formed is neutralized and the sugar fermented into alcohol which is recovered by distillation.

The calcium saccharate may be treated to recover sugar by dissolving it in warm water (50–60° C.) and then filtering off the insoluble calcium hydroxid, which may be dehydrated for further use. The filtrate is subjected to the action of carbon dioxid under pressure and agitation, whereby bicarbonates are formed and when the solution has ceased to be alkaline, it is boiled to break up the bicarbonates and the calcium carbonate formed is removed by filtration. The remaining sugar solution is decolorized with chars and evaporated to crystallization.

I claim:

The process of recovering sucrose from molasses which includes mixing the molasses with alcohol, adding an amount of lime to the solution to precipitate organic and coloring matter without precipitating the sucrose, separating the precipitate from the solution and agitating the alcoholic solution in the presence of a further amount of lime whereby substantially all of the sucrose is precipitated as calcium saccharate.

In testimony whereof, I have hereunto set my hand at San Francisco, California, this 8th day of January, 1919.

HOLGER DE FINE OLIVARIUS.

In presence of—

H. G. PROST.